(12) United States Patent
Kawabayashi

(10) Patent No.: US 10,943,103 B2
(45) Date of Patent: Mar. 9, 2021

(54) HUMAN BODY DETECTION APPARATUS, HUMAN BODY DETECTION METHOD, INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hisashi Kawabayashi, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 15/847,529

(22) Filed: Dec. 19, 2017

(65) Prior Publication Data

US 2018/0181801 A1 Jun. 28, 2018

(30) Foreign Application Priority Data

Dec. 26, 2016 (JP) .............................. JP2016-250946

(51) Int. Cl.
*G06K 9/00* (2006.01)
*G06T 7/11* (2017.01)
*G06K 9/46* (2006.01)

(52) U.S. Cl.
CPC ..... *G06K 9/00362* (2013.01); *G06K 9/00335* (2013.01); *G06K 9/00348* (2013.01); *G06K 9/4604* (2013.01); *G06T 7/11* (2017.01)

(58) Field of Classification Search
CPC ........... G06K 9/00362; G06K 9/00335; G06K 9/00348; G06K 9/4604; G06K 9/3241; G06K 9/00369; G06T 7/11; G06T 7/215
See application file for complete search history.

(56) References Cited

U.S. PATENT DOCUMENTS

| 2008/0123968 A1* | 5/2008 | Nevatia | G06K 9/00369 |
| | | | 382/228 |
| 2012/0155707 A1* | 6/2012 | Kawano | G06K 9/00342 |
| | | | 382/103 |
| 2014/0003725 A1* | 1/2014 | Kawano | G06K 9/3241 |
| | | | 382/203 |

FOREIGN PATENT DOCUMENTS

| JP | 9-50585 A | 2/1997 |
| JP | 2004-295781 A | 10/2004 |
| JP | 2008-048075 A | 2/2008 |
| JP | 2012-159957 A | 8/2012 |

OTHER PUBLICATIONS

10005889,Patent_Board_Decision-Examiner_Reversed,Nov. 14, 2007 (Year: 2007).*

* cited by examiner

*Primary Examiner* — Jianxun Yang
(74) *Attorney, Agent, or Firm* — Canon U.S.A., Inc. IP Division

(57) ABSTRACT

An information processing apparatus is provided that detects a moving object from an image, and detects a human body from a target region that is an upper part of a region corresponding to the moving object, using a feature of an upper body of a human body, to thereby reduce processing load.

9 Claims, 15 Drawing Sheets

HUMAN BODY DETECTION APPARATUS, HUMAN BODY DETECTION METHOD, INFORMATION PROCESSING APPARATUS, INFORMATION PROCESSING METHOD, AND STORAGE MEDIUM

BACKGROUND

Field

The present invention relates to an information processing apparatus, an information processing method, and a storage medium to which an object detection method with reduced processing load is applicable.

Description of the Related Art

As discussed in Japanese Patent Application Laid-Open No. 9-50585, there is a technique in which an object search is performed across the entire region of an image, the lower end position of a detected object is acquired, and a region where the object has entered is determined based on the acquired lower end position.

However, in the aforementioned technique, since the object search is performed across the entire region of an image, the processing load is high.

SUMMARY

According to an aspect of the present invention, a human body detection apparatus includes a moving object detection unit configured to detect a moving object from an image, and a first human body detection unit configured to detect a human body from a necessary feature region that is an upper part of a region corresponding to the moving object, using a feature of an upper body of a human body.

Further features of the present invention will become apparent from the following description of exemplary embodiments with reference to the attached drawings.

DESCRIPTION OF THE EMBODIMENTS

Various exemplary embodiments will be described below with reference to the drawings. Each of the embodiments of the present invention described below can be implemented solely or as a combination of a plurality of the embodiments or features thereof where necessary or where the combination of elements or features from individual embodiments in a single embodiment is beneficial.

In a first exemplary embodiment, information processing for high-speed human body detection from a detected moving object in a captured moving image in an information processing system configured to monitor moving images will be described. A human body includes a head, torso, arms and legs. But human body detection is successes based on at least of a part of the human body is detected. A human, or a human body, is an example of an object.

Figure 1:
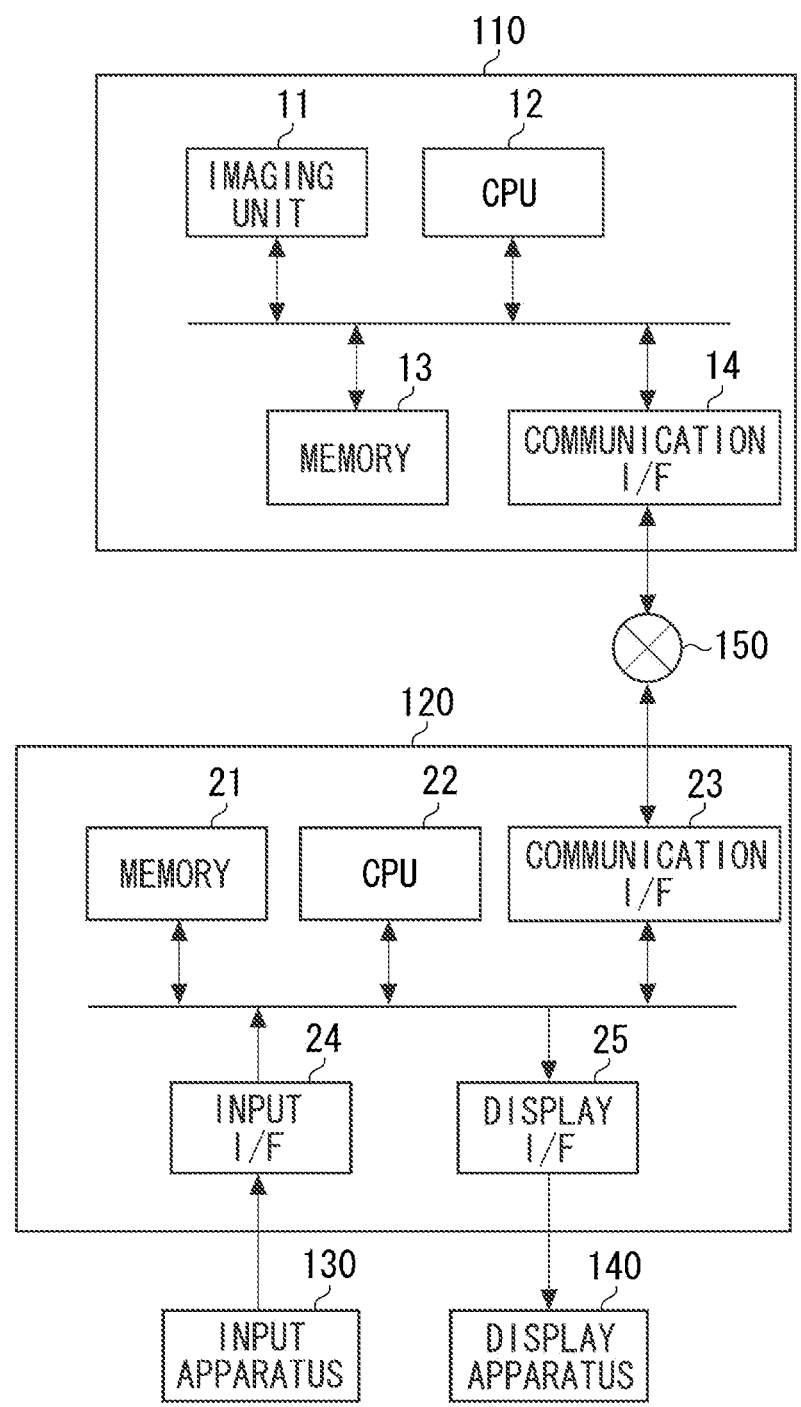
FIG. 1 illustrates a system configuration and a hardware configuration.

FIG. 1 illustrates an example of a system configuration and a hardware configuration of the information processing system. An imaging apparatus 110 captures images. A client apparatus 120 drives the imaging apparatus 110 and displays images captured by the imaging apparatus 110. An input apparatus 130 includes a mouse or a keyboard and transmits user input to the client apparatus 120. A display apparatus 140 includes a display and displays images output by the client apparatus 120. While the client apparatus 120 and the display apparatus 140 are illustrated as separate apparatuses in FIG. 1, the client apparatus 120 and the display apparatus 140 can be integrated together. Further, the input apparatus 130 and the display apparatus 140 can be integrated together, or the client apparatus 120, the input apparatus 130, and the display apparatus 140 can be integrated together. A network 150 connects the imaging apparatus 110 and the client apparatus 120. The network 150 includes, for example, a plurality of routers, switches, and cables that satisfy communication standards of a local network, etc. According to the present exemplary embodiment, any communication standard, scale, and configuration can be employed by which communication between the imaging apparatus 110 and the client apparatus 120 is realized. For example, the network 150 may be the Internet, a wired local area network (LAN), a wireless LAN, or a wide area network (WAN). Further, the number of imaging apparatuses 110 connected to the client apparatus 120 is not limited to one and can be more than one.

The hardware configuration of the imaging apparatus 110 will be described below with reference to FIG. 1. The hardware configuration of the imaging apparatus 110 includes an imaging unit 11, a central processing unit (CPU) 12, a memory 13, and a communication interface (I/F) 14. The imaging unit 11 includes an image sensor and an optical system for forming an image of a subject on the image sensor. The imaging unit 11 performs imaging on the image sensor with an intersection point of the optical axis of the optical system and the image sensor being an imaging center according to the control by the CPU 12. Examples of the image sensor include a complementary metal-oxide semiconductor (CMOS) image sensor and a charged coupled device (CCD) image sensor. The CPU 12 comprehensively controls the imaging apparatus 110. The memory 13 stores programs, images captured by the imaging unit 11, and data for use in execution of processing by the CPU 12. The communication I/F 14 controls communication with the client apparatus 120 via the network 150 based on the control performed by the CPU 12. The functions of the imaging apparatus 110 are realized by the CPU 12 executing a program stored in the memory 13.

Next, the hardware configuration of the client apparatus 120 will be described below. The hardware configuration of the client apparatus 120 includes a memory 21, a CPU 22, a communication I/F 23, an input I/F 24, and a display I/F 25. The CPU 22 comprehensively controls the client apparatus 120. The memory 21 stores programs, captured images transmitted from the imaging apparatus 110, and data for use in execution of processing by the CPU 22. The communication I/F 23 controls communication with the imaging apparatus 110 via the network 150 based on the control by the CPU 22. The input I/F 24 connects the client apparatus 120 and the input apparatus 130 together and controls input of information from the input apparatus 130. The display I/F 25 connects the client apparatus 120 and the display apparatus 140 together and controls output of information to the display apparatus 140. The functions of the client apparatus 120 and processing respectively illustrated in flow charts of FIGS. 3, 7, 9, and 12 are realized by the CPU 22 executing processing based on a program stored in the memory 21. The hardware configuration of the client apparatus 120 is not limited to the hardware configuration illustrated in FIG. 1. For example, the client apparatus 120 can include an audio output apparatus such as a speaker. In the case in which the hardware configuration of the client apparatus 120 includes an audio output apparatus, audio such as a warning can be output via the audio output apparatus.

Figure 2:
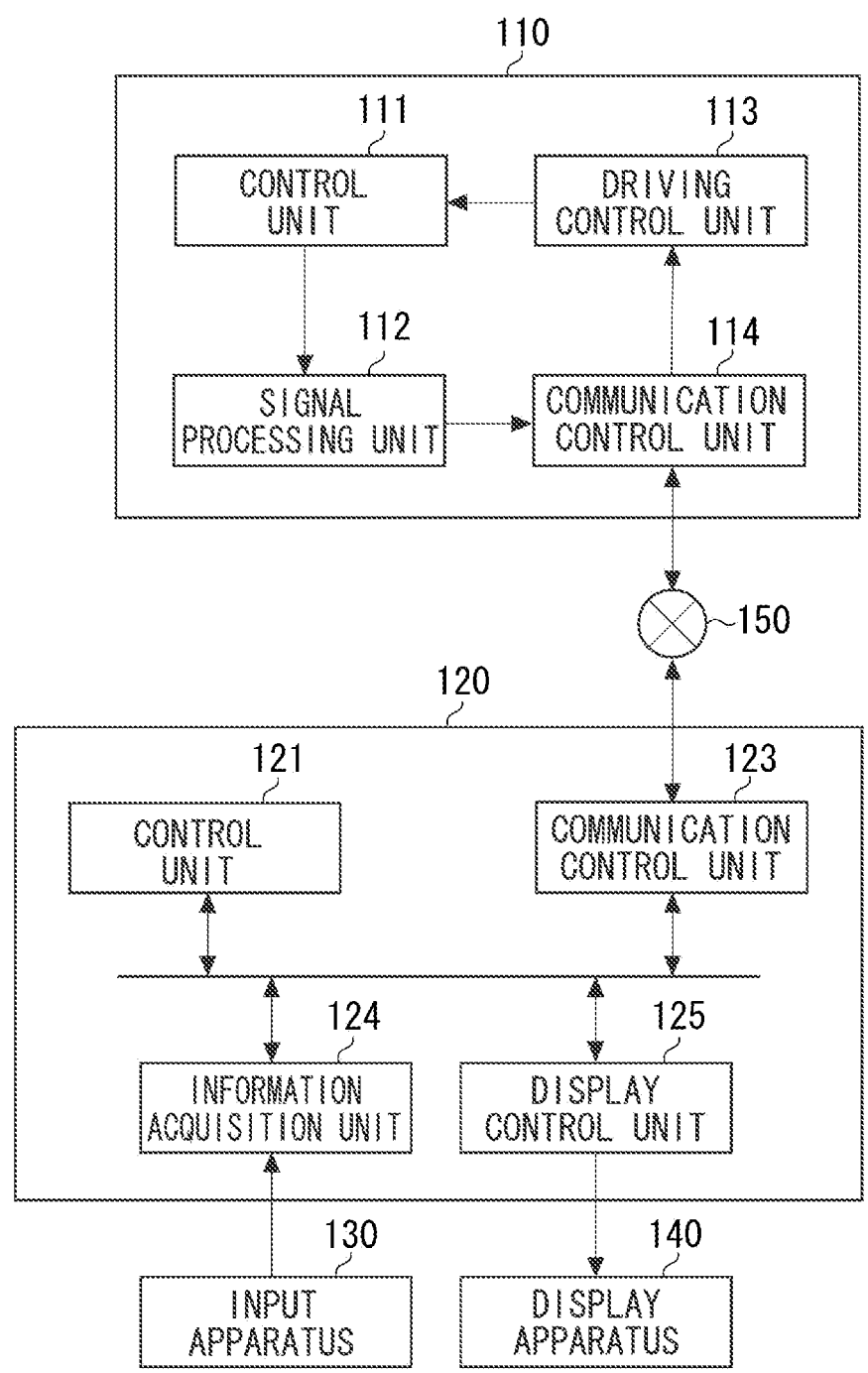
FIG. 2 illustrates functional configurations of an imaging apparatus and a client apparatus.

FIG. 2 illustrates an example of functional configurations of the imaging apparatus 110 and the client apparatus 120. The functional configuration of the imaging apparatus 110 includes a control unit 111, a signal processing unit 112, a driving control unit 113, and a communication control unit 114. The control unit 111 controls the imaging apparatus 110. The signal processing unit 112 performs image signal processing on images captured by the imaging unit 11. For example, the signal processing unit 112 codes images captured by the imaging unit 11. Examples of a coding method that the signal processing unit 112 can use include, but are not limited to, a Joint Photographic Experts Group (JPEG) coding method, H.264/Moving Picture Experts Group Phase 4 (MPEG-4) Advanced Video Coding (AVC) (hereinafter, "H.264") method, and High Efficiency Video Coding (HEVC) method. Further, the signal processing unit 112 can select a coding method from a plurality of coding methods and perform coding. The driving control unit 113 performs control to change the imaging direction of the imaging unit 11 and the viewing angle. While a case in which the imaging unit 11 can change the imaging direction in panning and tilt directions and can change the viewing angle of imaging is described in the present exemplary embodiment, the present exemplary embodiment is not limited to the described case. The imaging apparatus 110 does not have to include the function of changing the imaging direction in panning and tilt directions and the function of changing the viewing angle. The communication control unit 114 transmits to the client apparatus 120 captured images processed by the signal processing unit 112. Further, the communication control unit 114 receives from the client apparatus 120 control instructions with respect to the imaging apparatus 110.

The client apparatus 120 includes, as functional components, a control unit 121, a communication control unit 123, an information acquisition unit 124, and a display control unit 125. The control unit 121 controls the client apparatus 120. The communication control unit 123 receives captured images from the client apparatus 120. The information acquisition unit 124 receives user input from the input apparatus 130 and acquires input information from the input apparatus 130. The display control unit 125 outputs video images to the display apparatus 140 and causes the display apparatus 140 to execute display processing described below.

According to the present exemplary embodiment, the client apparatus 120 performs, on a captured image acquired from the imaging apparatus 110, feature extraction processing to extract a necessary feature for the detection of a human body existing in a moving object. In this way, the feature extraction processing is performed on real-time live video images to extract a necessary feature for the detection of a human body existing in a moving object. The feature extraction processing, however, is not limited to the above-described feature extraction processing. Alternatively, the client apparatus 120 can acquire moving images stored in the imaging apparatus 110 and perform feature extraction processing on each frame to extract a necessary feature for the detection of a human body existing in a moving object. Alternatively, the client apparatus 120 can perform feature extraction processing on each frame of a moving image stored in the client apparatus 120 to detect a necessary feature for the detection of a human body existing in a moving object. Alternatively, the client apparatus 120 can access a recording server, etc. and perform feature extraction processing on each frame of a moving image stored in the recording server to extract a necessary feature for the detection of a human body existing in a moving object.

Next, a flow of feature extraction processing for extracting a necessary feature region for human body detection according to the present exemplary embodiment will be described below with reference to FIGS. 3, 4, 5, and 6.

Figure 3:
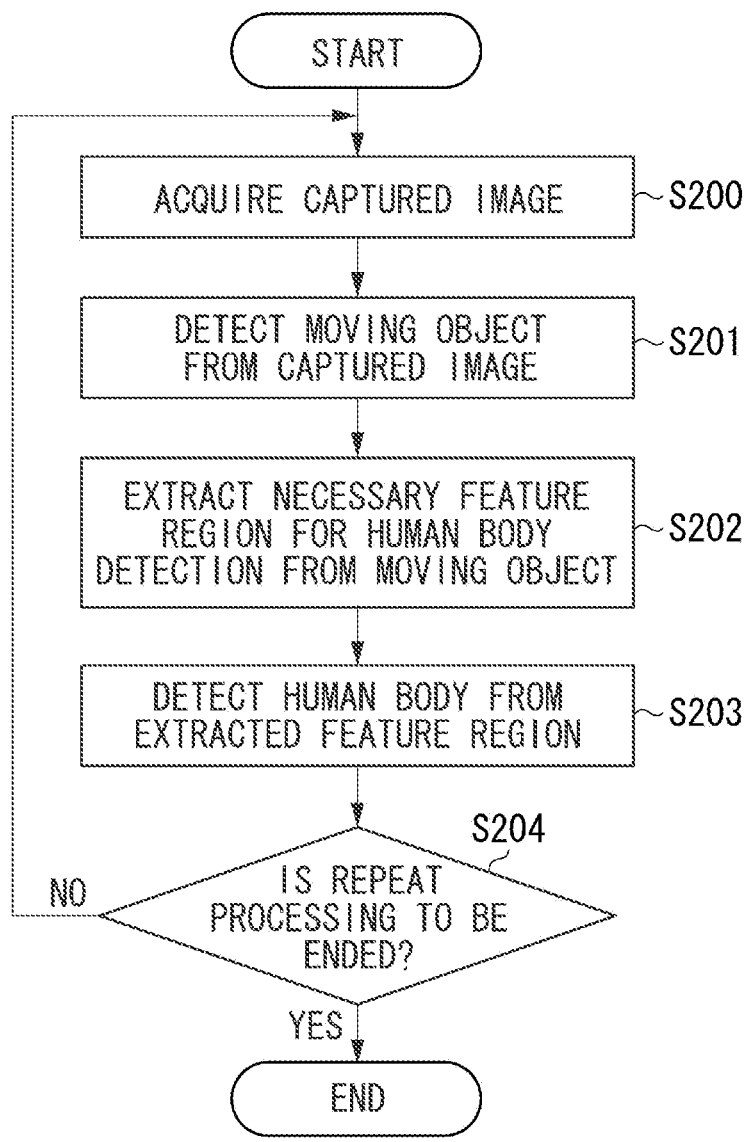
FIG. 3 is a flow chart schematically illustrating information processing.

FIG. 3 is a flow chart illustrating an example of information processing according to the present exemplary embodiment.

Figure 4:
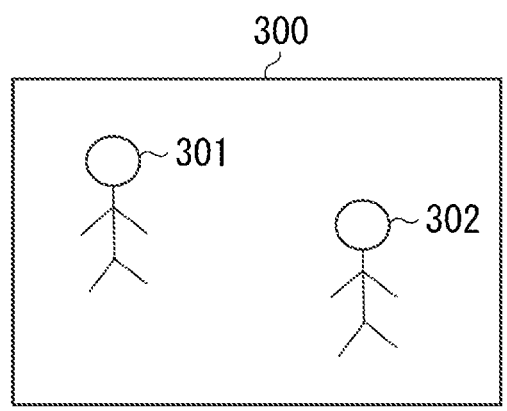
FIG. 4 illustrates an example of a captured image.

FIG. 4 illustrates an example of a captured image 300 that the control unit 121 acquires from the imaging apparatus 110.

As illustrated in FIG. 4, the captured image 300 includes images of moving objects 301 and 302 that have been captured simultaneously.

The moving objects 301 and 302 are moving human bodies.

The client apparatus 120 acquires a captured image, i.e., a moving image, from the imaging apparatus 110 and then starts the processing of extracting a necessary feature region for human body detection and detecting a human body.

In step S200, the control unit 121 acquires a captured image 300 from the imaging apparatus 110.

Next, in step S201, the control unit 121 performs moving object detection processing with respect to the captured image 300.

Figure 5:
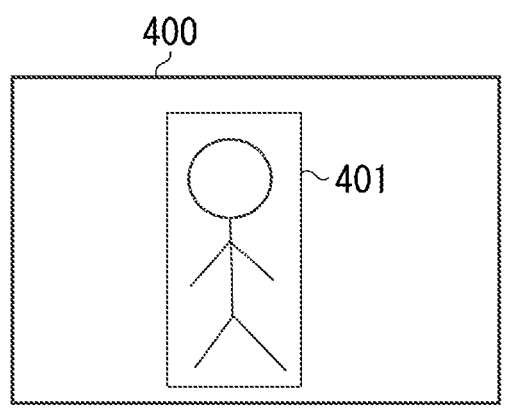
FIG. 5 illustrates a result of moving object detection processing.

FIG. 5 illustrates a result of the moving object detection processing performed in step S201. In FIG. 5, an image 400 represents a moving object detected from the captured image 300. A rectangle 401 is a circumscribed rectangle around the detected moving object.

Next, in step S202, the control unit 121 extracts from the moving object detected in step S201 only a region that includes a necessary feature for human body detection.

According to the present exemplary embodiment, the human body detection is performed using a feature of an upper body of a human body. Thus, the control unit 121 extracts an upper half of the detected moving object. The feature of the upper body is, for example, the shape of the upper body. The human body detection can be performed by pattern matching using the shape of the upper body. Further, the human body detection can be performed using color information about the upper body of the human body. Further, the region to be extracted does not have to be an exact upper half of the detected moving object and may be a region that does not include a lower edge of the moving object region.

More specifically, the control unit 121 calculates a vertical length of the circumscribed rectangle around the moving object and further calculates a half of the vertical length. Then, the control unit 121 determines a rectangle formed by the half of the vertical length and a horizontal length of the circumscribed rectangle as a necessary region for human body detection.

While the extraction of only a region that includes a necessary feature for human body detection is described as an example in the present exemplary embodiment, any other method can be used to extract a necessary region for human body detection in other exemplary embodiments.

Figure 6:
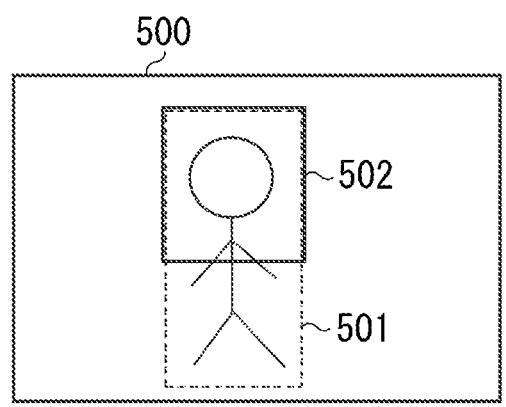
FIG. 6 illustrates a result of region extraction processing.

FIG. 6 illustrates a result of the region extraction processing performed in step S202. In FIG. 6, an image 500 illustrates a state in which a necessary region for human body detection is extracted from the moving object detected in the image 400. A rectangle 501 indicates the original circumscribed rectangle around the moving object. A rectangle 502 is an extracted necessary feature region for human body detection. Further, the rectangle 502 is an example of a region which is a part of a region corresponding to the detected moving object. Further, the rectangle 502 is an example of an upper region of the region corresponding to the detected moving object.

Next, in step S203, the control unit 121 detects a human body from the region extracted in step S202.

At this time, the control unit 121 may transmit the extracted necessary feature region for human body detection and the detected human body to a different terminal via the network 150 using the communication control unit 123 or may display the extracted necessary feature region for human body detection and the detected human body on the display apparatus 140.

Next, in step S204, the control unit 121 determines whether the repeat processing is to be ended. If the control unit 121 determines that the repeat processing is to be ended (YES in step S204), the processing illustrated in the flow chart in FIG. 3 is ended. On the other hand, if the control unit 121 determines that the repeat processing is not to be ended (NO in step S204), the processing returns to step S200.

The processing according to the present exemplary embodiment enables higher-speed detection of a human body existing in a moving object.

The first exemplary embodiment has an issue that the processing for extracting a region including a necessary feature for human body detection is also performed on a moving object including no human body. According to a second exemplary embodiment, whether a moving object includes a human body is determined using a feature of a moving object and then the processing for extracting a region including a necessary feature for human body detection is performed. In the present exemplary embodiment, processing in which whether to execute the processing for extracting a region including a necessary feature for human body detection which is described in the first exemplary embodiment is determined using the feature of the moving object will be described.

Figure 7:
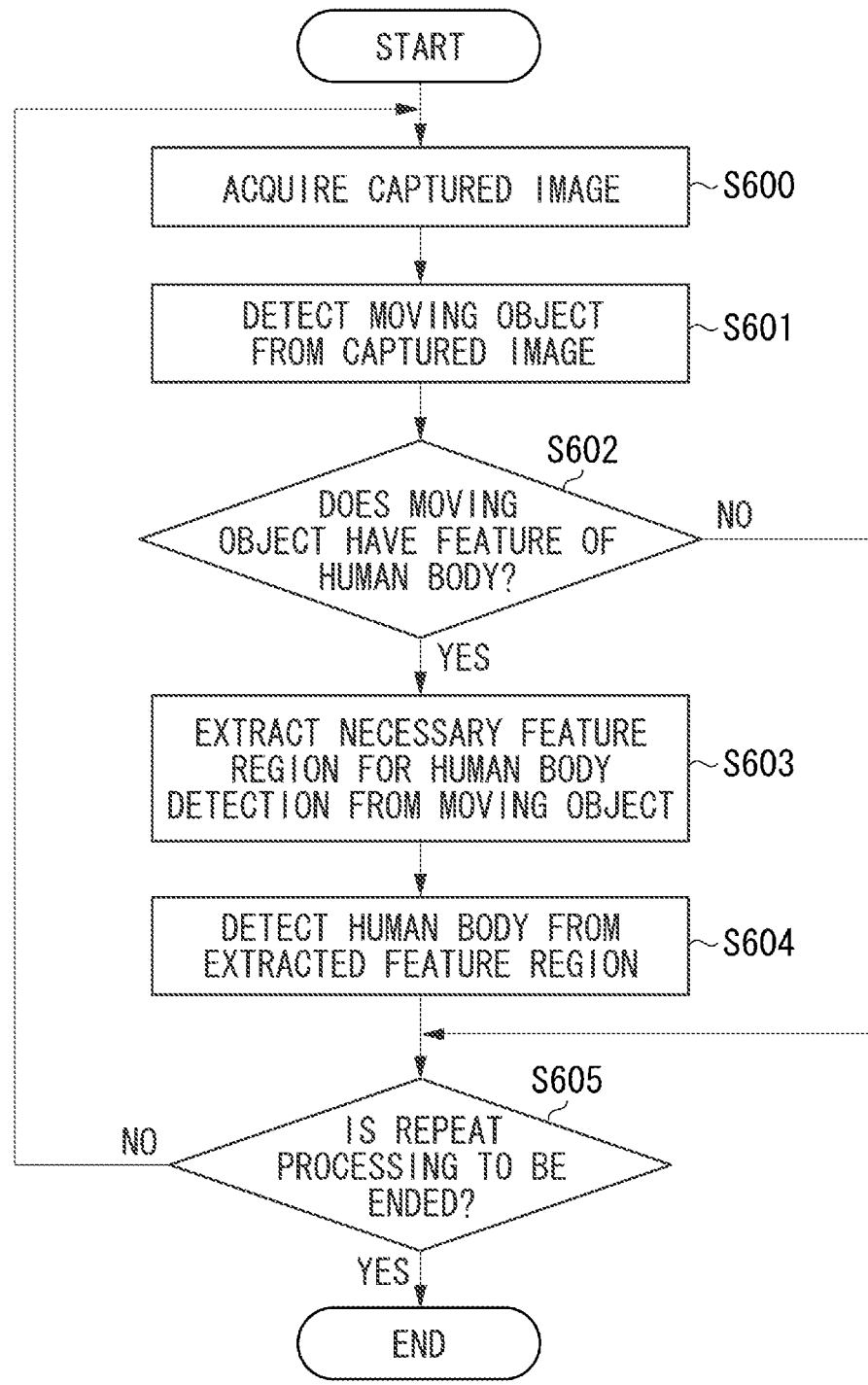
FIG. 7 is a flow chart schematically illustrating information processing.
Figure 8:
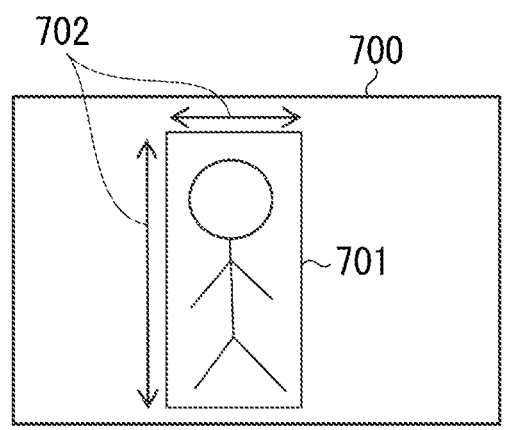
FIG. 8 illustrates an example in which the aspect ratio of a circumscribed rectangle is used.

The following describes the processing according to the present exemplary embodiment with reference to FIGS. 7 and 8.

FIG. 7 is a flow chart illustrating an example of information processing according to the present exemplary embodiment.

In step S600, the control unit 121 acquires a captured image from the imaging apparatus 110. The processing performed in step S600 is similar to the processing performed in step S200.

Next, in step S601, the control unit 121 detects a moving object from the captured image. The processing performed in step S601 is similar to the processing performed in step S201.

Next, in step S602, the control unit 121 determines whether the moving object detected in step S601 has a feature of a human body.

More specifically, the aspect ratio of the width to the length of the circumscribed rectangle around the moving object is used. An average aspect ratio of a human body which is the ratio of the shoulder-width (maximum value of horizontal width of human body) to the height (maximum value of vertical width of human body) is 0.22:1 to 0.24:1. Thus, the control unit 121 determines whether the detected moving object has the feature of the human body based on whether the aspect ratio of the circumscribed rectangle around the detected moving object satisfies the above-described aspect ratio.

FIG. 8 illustrates an example in which the aspect ratio of the circumscribed rectangle around the moving object is used when the control unit 121 determines whether the moving object in the image 400 has the feature of the human body.

In FIG. 8, an image 700 illustrates the moving object detected from the image 400. A rectangle 701 indicates the circumscribed rectangle around the moving object including a human body. An aspect ratio 702 is the aspect ratio indicating the horizontal-to-vertical ratio of the rectangle 701.

While the determination of whether a moving object has the feature of the human body is described as an example of the determination unit in the present exemplary embodiment, any other method can be used to determine whether a moving object has the feature of the human body.

If the control unit 121 determines that the detected moving object has the feature of the human body (YES in step S602), the processing proceeds to step S603. On the other hand, if the control unit 121 determines that the detected moving object does not have the feature of the human body (NO in step S602), the processing proceeds to step S605. In the case in which the control unit 121 determines in step S602 that the moving object does not have the feature of the human body, the human body feature extraction and the human body detection are not performed.

In step S603, the control unit 121 extracts from the moving object detected in step S601 only a region that includes a necessary feature human body detection. The processing performed in step S603 is similar to the processing performed in step S202.

Next, in step S604, the control unit 121 detects a human body from the region extracted in step S603. The processing performed in step S604 is similar to the processing performed in step S203.

In step S605, the control unit 121 determines whether the repeat processing is to be ended. If the control unit 121 determines that the repeat processing is to be ended (YES in step S605), the processing illustrated in the flow chart in FIG. 7 is ended. On the other hand, if the control unit 121 determines that the repeat processing is not to be ended (NO in step S605), the processing returns to step S600.

In the processing according to the present exemplary embodiment, the processing according to the first exemplary embodiment is performed if a moving object has a vertically-long shape which is the shape of a human body, so the detection of a human body existing in a moving object is executed at even higher speed.

Depending on an environment in which the imaging apparatus 110 is installed, there can be a region where the full body of a moving object including a human body cannot be imaged due to the presence of a shielding object. According to a third exemplary embodiment, processing of switching between the processing for detecting a human body from a feature region which is described in the first and second exemplary embodiments, and the processing for detecting a human body from a moving object region is performed for each region in a captured image. According to the present exemplary embodiment, a setting value indicating whether a region is a region on which the determination using the feature of the human body is to be performed, and a setting value indicating whether the region is a region from which a necessary feature region for human body detection in a moving object is to be extracted, are stored in advance in the memory 21, etc. for each region. For example, the CPU 22 stores the setting values for each region of a captured image in the memory 21, etc. in response to a setting operation performed by an operator via the input apparatus 130.

The processing according to the present exemplary embodiment will be described below with reference to FIGS. 9, 10, and 11.

Figure 9:
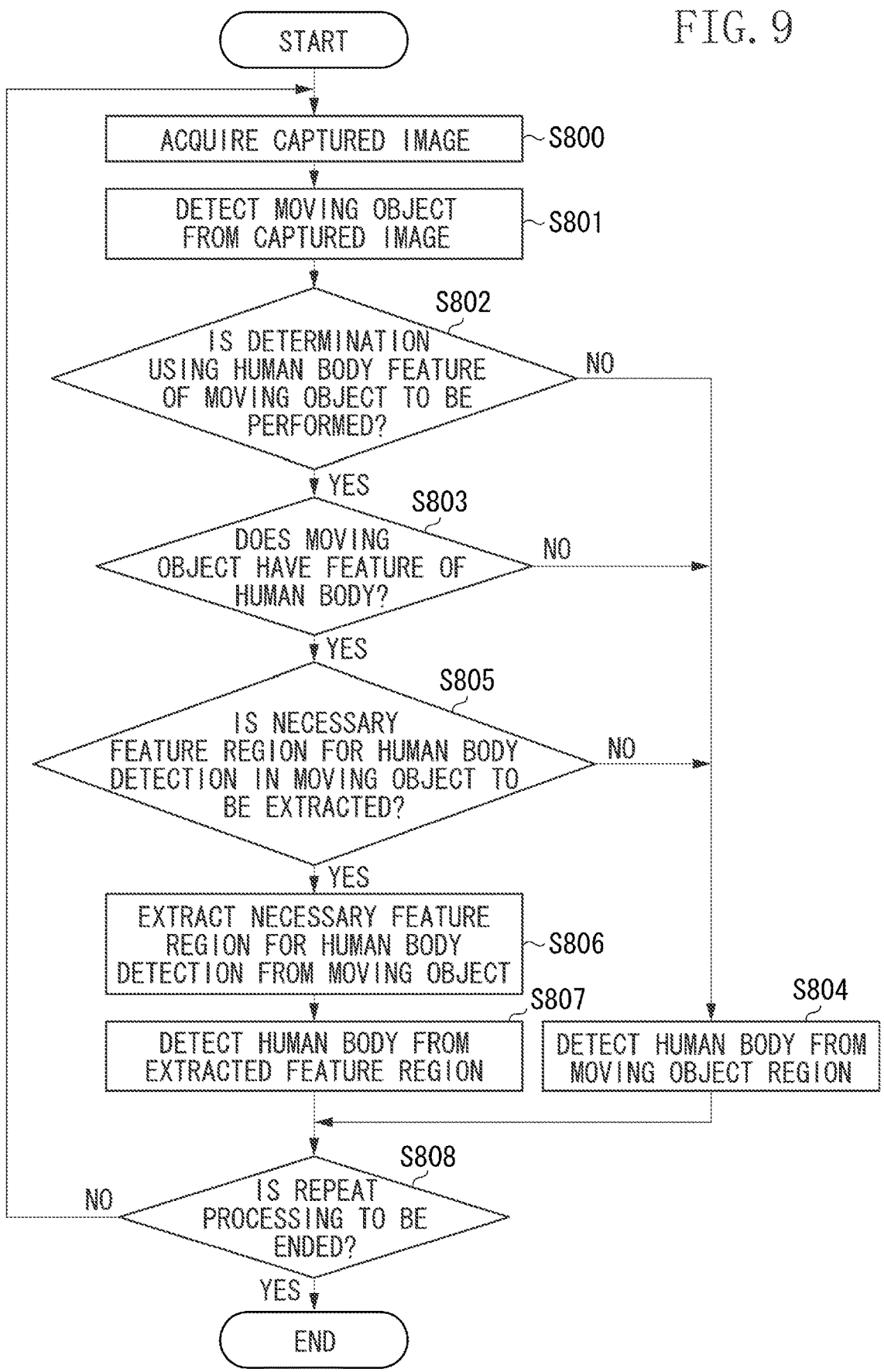
FIG. 9 is a flow chart schematically illustrating information processing.

FIG. 9 is a flow chart illustrating an example of information processing according to the present exemplary embodiment.

Figure 10:
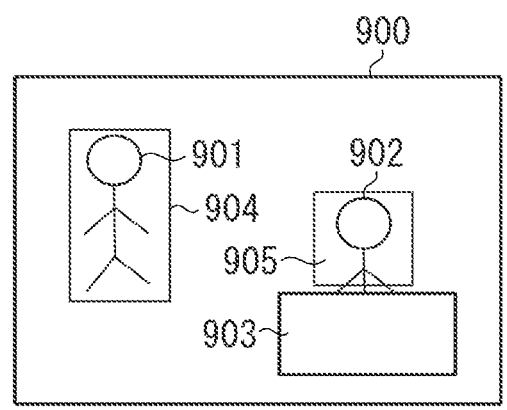
FIG. 10 schematically illustrates a case in which a full body of a human body cannot be imaged due to presence of an obstacle.

FIG. 10 illustrates a case in which a full body of a human body cannot be imaged due to presence of an obstacle. An image 900 indicates an image in which moving objects are detected from human bodies and the full body of one of the human bodies is imaged while the full body of the other of the human bodies is not imaged because the full body of the other is shielded due to the presence of an obstacle. The full body of a human body 901 is imaged while the full body of a human body 902 is not imaged. An obstacle 903 is an obstacle that shields the human body 902. A rectangle 904 is a circumscribed rectangle around the human body 901. A rectangle 905 is a circumscribed rectangle around the human body 902.

Figure 11:
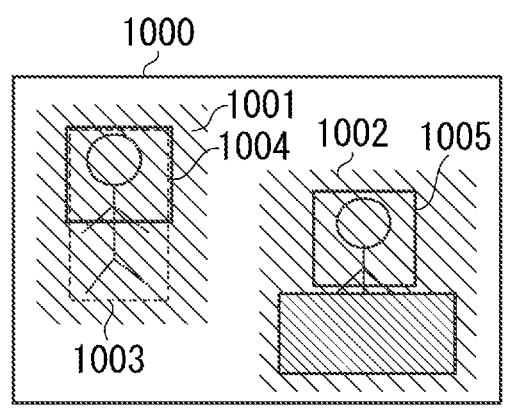
FIG. 11 illustrates an example in which processing is switched for each region of a captured image.

FIG. 11 illustrates the processing of switching between the processing for detecting a human body from a feature region and the processing for detecting a human body from a moving object region for each region of a captured image.

In FIG. 11, an image 1000 is an image indicating whether the execution of the processing for detecting a human body from a feature region in the image 900 is switched on.

A rectangular region 1001 is a rectangular region on which the processing of switching between the processing for detecting a human body from a feature region and the processing for detecting a human body from a moving object region is to be executed. A rectangular region 1002 is a rectangular region on which the processing of switching between the processing for detecting a human body from a feature region and the processing for detecting a human body from a moving object region is not to be executed.

A rectangle 1003 is the original circumscribed rectangle around the moving object detected by the moving object detection method. A rectangle 1004 is a region extracted by the processing for extracting only a necessary region for human body detection in the moving object. A rectangle 1005 is a region which is the original circumscribed rectangle around the moving object detected by the moving object detection method and on which the human body detection is to be performed.

In step S800, the control unit 121 acquires a captured image from the imaging apparatus 110. The processing performed in step S800 is similar to the processing performed in step S200.

Next, in step S801, the control unit 121 detects a moving object from the captured image. The processing performed in step S801 is similar to the processing performed in step S201.

Next, in step S802, the control unit 121 determines whether a processing target region is a region on which the determination using a human body feature of the moving object is to be performed. More specifically, the control unit 121 determines whether the processing target region is a region on which the determination using the human body feature of the moving object is to be performed based on the setting values stored in the memory 21 and indicating whether the region is a region on which the determination using the human body feature of the moving object is to be performed. If the control unit 121 determines that the processing target region is a region on which the determination using the human body feature of the moving object is to be performed (YES in step S802), the processing proceeds to step S803. On the other hand, if the control unit 121 determines that the processing target region is not a region on which the determination using the human body feature of the moving object is to be performed (NO in step S802), the processing proceeds to step S804.

In step S803, the control unit 121 determines whether the moving object has the human body feature. More specifically, the control unit 121 performs the determination using the method of step S602 according to the second exemplary embodiment. For example, the control unit 121 determines that the rectangular region 1001 in FIG. 11 is a region including a moving object having the human body feature, whereas the control unit 121 determines that the rectangular region 1002 in FIG. 11 is not a region including a moving object having the human body feature. If the control unit 121 determines that the moving object has the human body feature (YES in step S803), the processing proceeds to step S805. On the other hand, if the control unit 121 determines that the moving object does not have the human body feature (NO in step S803), the processing proceeds to step S804. Alternatively, the control unit 121 can use a method other than the method of step S602 according to the second exemplary embodiment to determine whether the moving object has the human body feature.

In step S804, the control unit 121 detects a human body from the moving object region.

In step S805, the control unit 121 determines whether the processing target region is a region from which a necessary feature region for human body detection in the moving object is to be extracted. More specifically, the control unit 121 determines whether the processing target region is a region from which a necessary feature region for human body detection in the moving object is to be extracted, based on the setting values stored in the memory 21 and indicating whether the region is a region from which a necessary feature region for human body detection in the moving object is to be extracted. If the control unit 121 determines that the processing target region is a region from which a necessary feature region for human body detection in the moving object is to be extracted (YES in step S805), the processing proceeds step S806. On the other hand, if the control unit 121 determines that the processing target region is not a region from which a necessary feature region for human body detection in the moving object is to be extracted (NO in step S805), the processing proceeds step S804. In step S806, the control unit 121 extracts from the moving object detected in step S801 only a region that includes a necessary feature for human body detection. The processing performed in step S806 is similar to the processing performed in step S202.

Next, in step S807, the control unit 121 detects a human body from the region extracted in step S806. The processing performed in step S807 is similar to the processing performed in step S203.

In step S808, the control unit 121 determines whether the repeat processing is to be ended. If the control unit 121 determines that the repeat processing is to be ended (YES in step S808), the processing illustrated in the flow chart in FIG. 9 is ended. On the other hand, if the control unit 121 determines that the repeat processing is not to be ended (NO in step S808), the processing returns to step S800.

According to the present exemplary embodiment, the setting value indicating whether the region is a region on which the determination using the human body feature of the moving object is to be performed, and the setting value indicating whether the region is a region from which a necessary feature region for human body detection in the moving object is to be extracted, are stored in advance in the memory 21, etc. for each region. Alternatively, a setting value indicating whether the region is a region on which the determination using the human body feature of the moving object is to be performed, and whether the region is a region from which a necessary feature region for human body detection in the moving object is to be extracted, can be stored in advance in the memory 21, etc. for each region. In this case, the control unit 121 performs the determination in steps S802 and S805 based on the same setting value.

In the processing according to the present exemplary embodiment, a region including an obstacle shielding a human body undergoes the processing for detecting a human body from a moving object region whereas a region including no obstacle shielding a human body undergoes the processing according to the first and second exemplary embodiments, so the detection of a human body existing in a moving object is performed as appropriate for each region.

According to the third exemplary embodiment, the setting value indicating whether the region is a region on which the determination using the human body feature of a moving object is to be performed, and the setting value indicating whether the region is a region from which a necessary feature region for human body detection in the moving object is to be extracted, need to be set in advance for each region. However, setting the setting values in advance for each region imposes a burden on a person who installs the information processing system. In a fourth exemplary embodiment, processing of automatically learning the processing of switching between the processing for detecting a human body from a feature region and the processing for detecting a human body from a moving object region will be described below.

The processing according to the present exemplary embodiment will be described below with reference to FIGS. 12, 13, 14, and 15.

Figure 12:
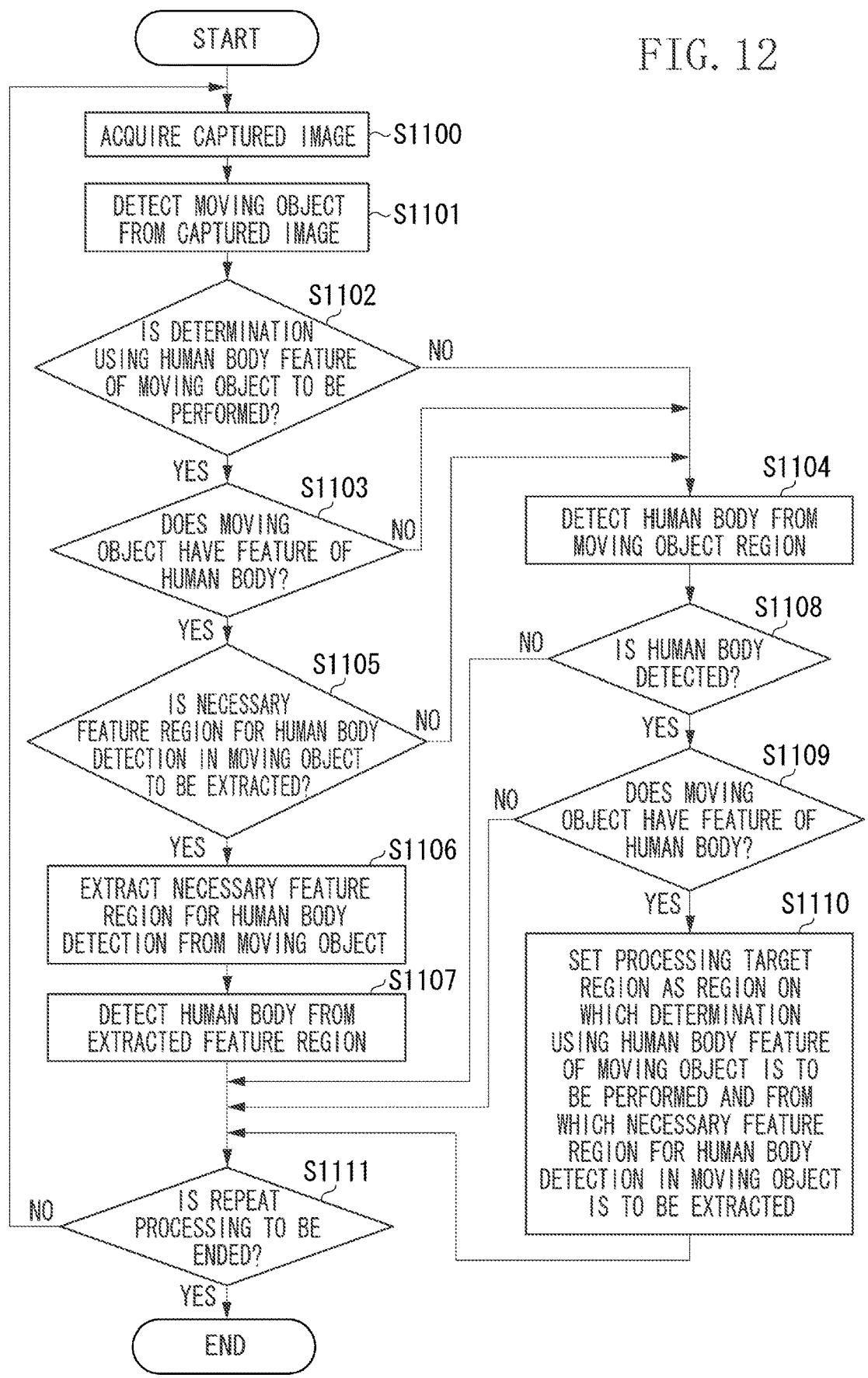
FIG. 12 is a flow chart schematically illustrating information processing.

FIG. 12 is a flow chart illustrating an example of information processing according to the present exemplary embodiment.

Figure 13:
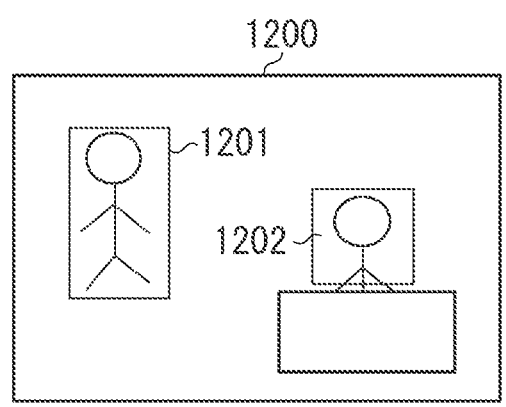
FIG. 13 schematically illustrates a case in which a full body of a human body cannot be imaged due to presence of an obstacle.

FIG. 13 illustrates a case in which a full body of a human body cannot be imaged due to presence of an obstacle. In FIG. 13, an image 1200 is an image in which moving objects are detected from human bodies and the full body of one of the human bodies is imaged while the full body of the other of the human bodies is shielded by an obstacle and is thus not imaged. A rectangle 1201 is a circumscribed rectangle around the human body the full body of which is imaged. A rectangle 1202 is a circumscribed rectangle around the human body the full body of which is not imaged.

In step S1100, the control unit 121 acquires a captured image from the imaging apparatus 110. The processing performed in step S1100 is similar to the processing performed in step S200.

Next, in step S1101, the control unit 121 detects a moving object from the captured image. The processing performed in step S1101 is similar to the processing performed in step S201.

Next, in step S1102, the control unit 121 determines whether the processing target region is a region on which the determination using the human body feature of the moving object is to be performed. More specifically, the control unit 121 determines whether the processing target region is a region on which the determination using the human body feature of the moving object is to be performed, based on the setting values stored in the memory 21. If the control unit 121 determines that the processing target region is a region on which the determination using the human body feature of the moving object is to be performed (YES in step S1102), the processing proceeds to step S1103. On the other hand, if the control unit 121 determines that the processing target region is not a region on which the determination using the human body feature of the moving object is to be performed (NO in step S1102), the processing proceeds to step S1104.

In step S1103, the control unit 121 determines whether the moving object has the human body feature. More specifically, the control unit 121 performs the determination using the method of step S602 according to the second exemplary embodiment. If the control unit 121 determines that the moving object has the human body feature (YES in step S1103), the processing proceeds to step S1105. On the other hand, if the control unit 121 determines that the moving object does not have the human body feature (NO in step S1103), the processing proceeds to step S1104. Alternatively, the control unit 121 can use a method other than the method of step S602 according to the second exemplary embodiment to determine whether the moving object has the human body feature.

In step S1104, the control unit 121 detects a human body from the moving object region.

In step S1105, the control unit 121 determines whether the processing target region is a region from which a necessary feature region for human body detection in the moving object is to be extracted. More specifically, the control unit 121 determines whether the processing target region is the region from which a necessary feature region for human body detection in the moving object is to be extracted, based on the setting values stored in the memory 21. If the control unit 121 determines that the processing target region is a region from which a necessary feature region for human body detection in the moving object is to be extracted (YES in step S1105), the processing proceeds to step S1106. On the other hand, if the control unit 121 determines that the processing target region is not a region from which a necessary feature region for human body detection in the moving object is to be extracted (NO in step S1105), the processing proceeds to step S1104.

In step S1106, the control unit 121 extracts from the moving object detected in step S1101 only a region that includes a necessary feature for human body detection. The processing performed in step S1106 is similar to the processing performed in step S202. Next, in step S1107, the control unit 121 detects a human body from the region extracted in step S1106. The processing performed in step S1107 is similar to the processing performed in step S203.

In step S1108, the control unit 121 determines whether a human body is detected in step S1104. If the control unit 121 determines that a human body is detected (YES in step S1108), the processing proceeds to step S1109. On the other hand, if the control unit 121 determines that no human body is detected (NO in step S1108), the processing proceeds to step S1111.

In step S1109, the control unit 121 determines whether the moving object detected in step S1101 has the human body feature. More specifically, the control unit 121 performs the determination using the method of step S602 according to the second exemplary embodiment. If the control unit 121 determines that the moving object has the human body feature (YES in step S1109), the processing proceeds to step S1110. On the other hand, if the control unit 121 determines that the moving object does not have the human body feature (NO in step S1109), the processing proceeds to step S1111. Alternatively, the control unit 121 can use a method other than the method of step S602 according to the second exemplary embodiment to determine whether the moving object has the human body feature.

Figure 14:
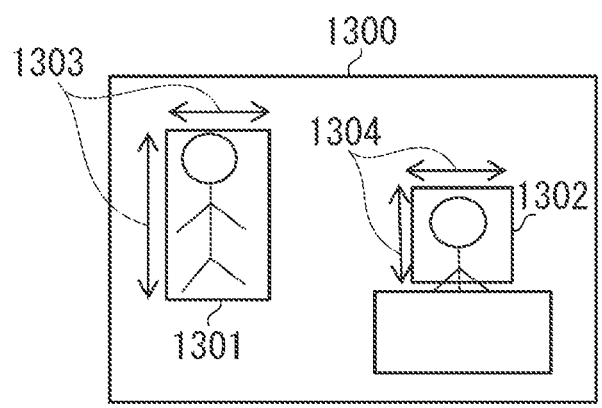
FIG. 14 illustrates an example of a result of detection of human bodies from moving objects.

FIG. 14 illustrates an example of a result of detection of human bodies from moving objects in the image 1200. In FIG. 14, an image 1300 illustrates the human body detection from the moving objects included in the image 1200. Rectangles 1301 and 1302 are circumscribed rectangles around the moving objects including the human bodies. An aspect ratio 1303 is the horizontal-to-vertical ratio of the rectangle 1301 specified in aspect ratio. An aspect ratio 1304 is the horizontal-to-vertical ratio of the rectangle 1302 specified in aspect ratio.

In step S1110, the control unit 121 sets the processing target region as a region on which the determination using the human body feature of the moving object is to be performed and from which a necessary feature region for human body detection in the moving object is to be extracted, and stores the setting value together with information about the processing target region in the memory 21, etc.

Figure 15:
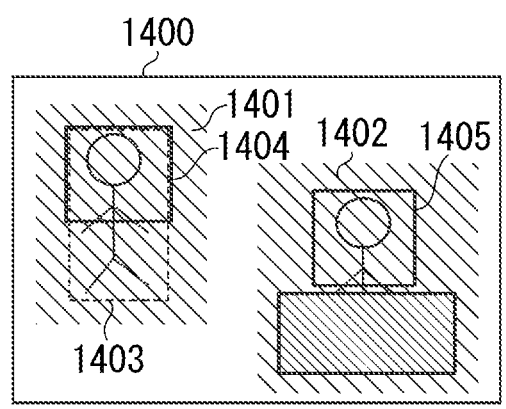
FIG. 15 illustrates an example of a result of automatic learning.

FIG. 15 illustrates an example of a result of automatic learning in step S1110. In FIG. 15, an image 1400 illustrating the detection of human bodies from moving images captured after the learning in step S1110.

A rectangle 1401 is a rectangular region on which the processing of switching between the processing for detecting a human body from a feature region and the processing for detecting a human body from a moving object region is to be executed. A rectangle 1402 is a rectangular region on which the processing of switching between the processing for detecting a human body from a feature region and the processing for detecting a human body from a moving object region is not to be executed.

A rectangle 1403 is the original circumscribed rectangle around the moving object detected by the moving object detection method. A rectangle 1404 is a region extracted by the processing for extracting only a necessary region for human body detection in the moving object. A rectangle 1405 is the original circumscribed rectangle around the moving object detected by the moving object detection method and is a region on which human body detection is to be performed.

In step S1111, the control unit 121 determines whether the repeat processing is to be ended. If the control unit 121 determines that the repeat processing is to be ended (YES in step S1111), the processing illustrated in the flow chart in FIG. 12 is ended. On the other hand, if the control unit 121 determines that the repeat processing is not to be ended (NO in step S1111), the processing returns to step S1100.

In the processing according to the present exemplary embodiment, a region including an obstacle shielding a human body undergoes the processing for detecting a human body from a moving object region whereas a region including no obstacle shielding a human body undergoes the processing according to the first and second exemplary embodiments, so the detection of a human body existing in a moving object is performed as appropriate for each region. Further, the processing according to the present exemplary embodiment realizes the omission of the setting of the setting value for each region in advance, compared to the processing according to the third exemplary embodiment.

The exemplary embodiments of the present invention can also be realized by one or more processors of a computer of a system or apparatus, reading and executing a program, supplied to the system or apparatus via a network or storage medium, for realizing one or more functions of the above-described exemplary embodiments. Further, the exemplary embodiments of the present invention can also be realized by a circuit (e.g., application-specific integrated circuit (ASIC)) that realizes one or more functions.

While the present invention has been described with reference to the exemplary embodiments, it is to be understood that the invention is not limited to the disclosed exemplary embodiments. A part of the functional configuration of the imaging apparatus 110 in FIG. 2 can be implemented as hardware of the imaging apparatus 110. Further, a part of the functional configuration of the client apparatus 120 in FIG. 2 can be implemented as hardware of the client apparatus 120. Further, the hardware configurations of the imaging apparatus 110 and the client apparatus 120 in FIG. 1 are mere examples and can include a plurality of CPUs, memories, and communication interfaces.

Further, the above-described exemplary embodiments can be implemented in combination as desired.

Further, instead of performing the human body detection processing on all extracted feature regions, the control unit 121 can end the detection processing at the time of detecting a human body according to the shape of a rectangle, etc. In this way, the human body detection is performed at even higher speed.

Further, while the processes illustrated in the flow charts are described as being performed at the client apparatus 120 in the above-described exemplary embodiments, for example, a part or all of the processes illustrated in the flow charts can be performed at the imaging apparatus 110. For example, in a case in which the imaging apparatus 110 executes steps S200 to S202 in the flow chart in FIG. 3, the CPU 12 of the imaging apparatus 110 transmits an extracted feature region to the client apparatus 120 via the communication I/F 14. The CPU 22 of the client apparatus 120 having received the feature region from the imaging apparatus 110 executes step S203 and displays a result of the processing on the display apparatus 140, etc.

Further, while the above-described exemplary embodiments are described with reference to the example in which a human body existing in a moving object is detected, a detection target is not limited to the human bodies and can be, for example, a car, motorcycle, drone, or domestic animal existing in a moving object. It is possible to adapt above-described exemplary embodiments other than human body by using upper part of features (e.g. shape, color) of respective detection targets.

According to the above-described exemplary embodiments, an object (e.g., human body) existing in a moving object is detected at high speed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-250946, filed Dec. 26, 2016, which is hereby incorporated by reference herein in its entirety.

What is claimed is:

1. An information processing apparatus comprising:
   a computer executing instructions that, when executed by the computer, cause the computer to function as:
   a moving object detection unit configured to detect a moving object from an image;
   a detection unit configured to detect a predetermined object in the image, using a feature of the predetermined object; and
   a determination unit configured to:
   determine that a first detection for detecting a predetermined object from a region of the moving object is performed, if an aspect ratio of the region of the moving object does not satisfy a predetermined aspect ratio; and
   determine that a second detection for detecting the predetermined object from a partial region of the region of the moving object is performed, if the aspect ratio of the region of the moving object satisfies the predetermined aspect ratio,
   wherein the predetermined aspect ratio corresponds to an aspect ratio of a rectangular region a length of which is longer than a width of the rectangular region, and
   wherein the detection unit performs the first detection if the first detection is determined by the determination unit to be performed, and the detection unit performs the second detection if the second detection is determined by the determination unit to be performed.

2. The information processing apparatus according to claim 1, wherein the first detection is for detecting the predetermined object from an entire region of the region of the moving object.

3. The information processing apparatus according to claim 1, wherein the second detection is for detecting the predetermined object from an upper part of the region of the moving object.

4. The information processing apparatus according to claim 1, wherein the region of the moving object is a region of a circumscribed rectangle around the moving object.

5. An information processing method that is executed by an information processing apparatus, the method comprising:
   detecting a moving object from an image;
   determining that a first detection for detecting the predetermined object from a region of the moving object is performed, if an aspect ratio of the region of the moving object does not satisfy a predetermined aspect ratio corresponding to an aspect ratio of a rectangular region a length of which is longer than a width of the rectangular region;
   determining that a second detection for detecting the predetermined object from a partial region of the region of the moving object is performed, if the aspect ratio of the region of the moving object satisfies the predetermined aspect ratio; and
   detecting the predetermined object, using a feature of the predetermined object, by performing the first detection if the first detection is determined to be performed or by performing the second detection if the second detection is determined to be performed.

6. The information processing method according to claim 5, wherein the first detection is for detecting the predetermined object from an entire region of the region of the moving object.

7. The information processing method according to claim 5, wherein the region of the moving object is a region of a circumscribed rectangle around the moving object.

8. The information processing method according to claim 5, wherein the second detection is for detecting the predetermined object from an upper part of the region of the moving object.

9. A non-transitory computer-readable storage medium that stores a program for causing a computer to execute a method, the method comprising:
   detecting a moving object from an image;
   determining that a first detection for detecting a predetermined object from a region of the moving object is performed, if an aspect ratio of the region of the moving object does not satisfy a predetermined aspect ratio corresponding to an aspect ratio of a rectangular region a length of which is longer than a width of the rectangular region;

determining that a second detection for detecting the predetermined object from a partial region of the region of the moving object is performed, if the aspect ratio of the region of the moving object satisfies the predetermined aspect ratio; and detecting the predetermined object, using a feature of the predetermined object, by performing the first detection if the first detection is determined to be performed or by performing the second detection if the second detection is determined to be performed.

* * * * *